United States Patent
Tsou et al.

(10) Patent No.: US 10,138,320 B2
(45) Date of Patent: Nov. 27, 2018

(54) COMB-BLOCK HIGH DENSITY POLYETHYLENES AND METHODS OF MAKING THEM

(71) Applicant: ExxonMobil Chemical Patents Inc., Baytown, TX (US)

(72) Inventors: Andy H. Tsou, Houston, TX (US); Crisita Carmen C. H. Atienza, Houston, TX (US); Peijun Jiang, League City, TX (US); Antonios Doufas, Baytown, TX (US); Carlos R. Lopez-Barron, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 87 days.

(21) Appl. No.: 15/428,346

(22) Filed: Feb. 9, 2017

(65) Prior Publication Data
US 2017/0275409 A1 Sep. 28, 2017

Related U.S. Application Data

(60) Provisional application No. 62/312,210, filed on Mar. 23, 2016.

(30) Foreign Application Priority Data

Apr. 13, 2016 (EP) .................................... 16165129

(51) Int. Cl.
C08F 297/08 (2006.01)
C08F 10/14 (2006.01)
C08F 4/76 (2006.01)

(52) U.S. Cl.
CPC ...... *C08F 297/083* (2013.01); *C08L 2205/02* (2013.01)

(58) Field of Classification Search
CPC ........ C08F 297/083; C08F 4/76; C08F 10/14; C08F 110/06; C08F 4/60; C08F 4/64
See application file for complete search history.

(56) References Cited

U.S. PATENT DOCUMENTS

| | | | |
|---|---|---|---|
| 5,728,335 A | 3/1998 | Neubauer | |
| 5,739,266 A | 4/1998 | Piana | |
| 9,193,813 B2 * | 11/2015 | Kol | .................. C08F 110/06 |
| 2003/0105250 A1 | 6/2003 | Whiteker | |
| 2004/0214953 A1 | 10/2004 | Yamada et al. | |
| 2005/0065286 A1 | 3/2005 | Degroot et al. | |
| 2009/0318640 A1 | 12/2009 | Brant et al. | |
| 2013/0310529 A1 * | 11/2013 | Kol | .................. C07C 215/50 526/172 |
| 2014/0039140 A1 | 2/2014 | Giesbrecht et al. | |
| 2014/0128557 A1 | 5/2014 | Giesbrecht et al. | |
| 2014/0256893 A1 | 9/2014 | Hagadorn et al. | |
| 2015/0158956 A1 | 6/2015 | Comolli et al. | |
| 2015/0158958 A1 * | 6/2015 | Harrington | ......... C08F 4/64189 526/133 |
| 2015/0337058 A1 | 11/2015 | Giesbrecht et al. | |
| 2018/0044453 A1 * | 2/2018 | Jiang | .................... C08F 210/16 |

FOREIGN PATENT DOCUMENTS

WO    WO94-07930    4/1994

OTHER PUBLICATIONS

Kuroki et al., "Mechanism for Long-Chain Branching in the Thermal Degradation of Linear High-Density Polyethylene", Macromolecules 1982, 15, pp. 1460-1464.

Huang et al., "Dependence of Slow Crack Growth in Polyethylene on Butyl Branch Density: Morphology and Theory", J. Polym. Sci., Part B. Polym. Phys., 29 (1991) pp. 129-137.

Vega et al., "Comparison of the Rheological Properties of Metallocene-Catalyzed and Conventional High-Density Polyethylenes", Macromolecules 1996, 29, pp. 960-965.

Harrison et al., "Olefin Polymerization Using Supported Metallocene Catalysts: Development of High Activity Catalysts for Use in Slurry and Gas Phase Ethylene Polymerizations", Journal of Molecular Catalysis A: Chemical 128 (1998) pp. 65-77.

Read et al., "Molecular Rheology and Statistics of Long Chain Branched Metallocene-Catalyzed Polyolefins", Macromolecules, 2001, 34, pp. 1928-1945.

* cited by examiner

*Primary Examiner* — Robert D. Harlan
(74) *Attorney, Agent, or Firm* — Kevin M. Faulkner (57) ABSTRACT

A process for preparing a polyethylene composition comprising contacting ethylene with a first salan catalyst precursor and an activator to form branched vinyl/vinylidene-terminated high density polyethylene having a number average molecular weight (Mn) of at least 5,000 g/mole; and contacting the branched vinyl/vinylidene-terminated high density polyethylene with ethylene and a second metallocene catalyst precursor and an activator to form a comb-block HDPE. The polyethylene composition comprises a polyethylene backbone, and one or more branched high density polyethylene combs pendant to the backbone, the combs having an Mn of at least 5,000 g/mole, where the polyethylene has a branching index (g') of less than 0.9.

33 Claims, 4 Drawing Sheets

COMB-BLOCK HIGH DENSITY POLYETHYLENES AND METHODS OF MAKING THEM

PRIORITY CLAIM TO RELATED APPLICATIONS

This application claims priority to U.S. Provisional Application Ser. No. 62/312,210 filed Mar. 23, 2016, and European Application No. 16165129.4 filed Apr. 13, 2016, the disclosures of which are fully incorporated herein by their reference.

FIELD OF THE INVENTION

The present invention relates to polyethylene, and in particular to highly branched polyethylenes that are useful in blends with other linear polyethylenes for improved extensional viscosity.

BACKGROUND OF THE INVENTION

Discovery of chromium catalysts led to the synthesis of linear high density polyethylene (HDPE) in the 1950's that to this day is still being manufactured. Although such HDPE's have broad molecular weight distributions (Mw/Mn typically greater than 6) they still don't have sufficient processability, shear thinning or high melt strength; and such HDPE's tend to have undesirably high die swell for certain applications such as for films and for pipes. Post-reactor oxygen tailoring has been employed to introduce a small amount of long chain branching in such HDPE's for film and blow molding applications, but the amount of branching is typically insufficient for pipe extrusion needs (see U.S. Pat. No. 5,728,335 and U.S. Pat. No. 5,739,266, and 15 MACROMOLECULES, 1460 (1982)).

One method to further enhance processability while raising the toughness in HDPE is to produce bimodal HDPE where the high molecular weight component contains a small amount of co-monomer (typically hexene or octane) while the low molecular weight component contains little or no co-monomer. Although these bimodal HDPEs can be used for pipe applications, their processability could still be further improved in order to raise the extrusion rate, reduce sag and die swell, and prevent ovality during extrusion.

Introduction of single site metallocene catalysts for the synthesis of polyethylene does not alter the coordinative insertion polymerization mechanism of earlier catalyst systems, such as chromium oxide or titanium chloride, and does not inherently create long chain branches unless the catalyst system is specially tailored. As first reported in EP 0 662 980 A1, and later in 29 MACROMOLECULES, 960 (1996), and 128 J. MOL. CATAL. A: CHEM., 65 (1998), long chain branches can be created in metallocene catalyzed ethylene polymerization by a copolymerization route in which in-situ generated vinyl/vinylidene-terminated polyethylene is incorporated into growing polymer chains. For this to occur, the metallocene catalysts need to have high vinyl selectivity (prefer beta hydride elimination for vinyl chain ends) and good copolymerization capability. Also, long chain branched polyethylene can be produced with mono-cyclopentadienyl metallocene, as well as certain $C_2$ symmetric metallocenes. Both supported and homogenous catalysts can be employed for long chain branched polyethylene synthesis and they can be made in gas phase, solution, or slurry reactors.

There are, however, two major issues with prior approaches in synthesizing long chain branched polyethylene by metallocene. One is that the reinsertion frequency of vinyl/vinylidene-terminated polyethylene is very low during polymerization which leads to lightly branched chains. With low branching density, it is then required to have many long chain branched molecules in the final products, typically greater than 30 wt % (balanced by linear molecules), in order to see any processability improvements. Further, addition of long chain branched polyolefins into a linear polyolefin can lead to an erosion of the linear polyolefin's toughness especially, when larger amounts are used. This is believed to be due to the reduction of polymer coil dimension in the presence of the long chain branches.

In accordance to Huang-Brown tie chain theory (Y. L. Huang and N. Brown, 29 J. POLYM. SCI. POLYM. PHYS. ED., 129 (1991)), maintaining the crystallize size while reducing the coil dimension leads to fewer tie chains in-between crystallites, as well as lower toughness. For instance, the dart impact toughness of long-chain branched Enable™ (ExxonMobil Chemical Company) is only about 25 to 35% of the dart impact value of linear Exceed™ LLDPE (ExxonMobil Chemical Company) with similar molecular weights. Thus, there is still a need to introduce a highly long chain branched HDPE.

References of interest include US 2004/214953; US 2005/065286; US 2009/318640; and US 2014/039140.

SUMMARY OF THE INVENTION

Disclosed is a process for preparing a polyethylene composition comprising contacting, at a temperature of at least 100° C., ethylene with a first salan catalyst precursor and an activator to form branched vinyl/vinylidene-terminated high density polyethylene ("bVT-HDPE") having a number average molecular weight (Mn) of at least 5,000 g/mole; contacting, at a temperature of at least 100° C., the bVT-HDPE with ethylene and a second metallocene catalyst precursor and an activator to form a comb-block HDPE ("comb-block HDPE"), and isolating the polyethylene composition.

Also disclosed is a polyethylene composition comprising a comb-block HDPE comprising a polyethylene backbone; and one or more branched high density polyethylene combs pendant to the backbone, the combs having a number average molecular weight (Mn) of at least 5,000, or 8,000 g/mole; or within a range from 5,000, or 8,000 g/mole to 20,000, or 25,000, or 30,000 g/mole; and wherein the polyethylene has a branching index of less than 0.9, or 0.85, and has within a range from 1 to 4 branches per 1000 carbon atoms as measured by $C^{13}$ NMR, wherein the polyethylene backbone and branched high density polyethylene combs are formed by different catalysts.

DETAILED DESCRIPTION OF THE INVENTION

The inventors solve the problems in the prior art by providing a high density, highly branched polyethylene, a polyethylene particularly suited as a modifying additive in a polyolefin composition. The approach described herein is to introduce long chain branches in HDPE compositions by adding a small amount of independently produced highly branched comb HDPE into a more linear polyethylene. Highly branched HDPE is preferred so that only a small amount is needed to deliver processability enhancement, and a comb-branched structure is most preferred for reduced coil shrinkage and lower impact on toughness, without compromising its density and stiffness.

As referred to herein, a "high density polyethylene" (HDPE) is any polyethylene comprising at least 80 wt %, by weight of the polymer, of ethylene derived units and has a density (ASTM D4883-8) of at least 0.93 g/cm$^3$. Such HDPE's may be branched as referred to herein.

The "polyethylene composition" described herein is a composition that includes so called "comb-block HDPE's" produced in serial stages or reactors by copolymerizing, in the second stage or reactor, bVT-HDPE synthesized in the first stage or reactor, or otherwise provided from another source, and ethylene and optionally other using a good macromer incorporation catalyst. Thus, one "block" of the comb-block HDPE is derived from the bVT-HDPE, and the second "block" is derived from polymer made in a second stage or reactor that also incorporates the bVT-HDPE blocks, thus producing a "comb-like" structure. The serial stage or reactor approach delivers concentrated bVT-HDPE macromer feed in the second stage or reactor for high incorporation and high degree of branching. The bVT-HDPE having a branching index (g') of less than 0.95 and vinyl and/or vinylidene content of greater than 90% is preferably synthesized using a salan catalyst. Hence, after their copolymerization with ethylene in the second reactor, a comb-block HDPE is produced while some bVT-HDPE remains, thus forming the "polyethylene composition" described herein.

Thus, provided in any embodiment is a polyethylene composition comprising two covalently bound blocks comprising a polyethylene backbone, and branched high density polyethylene branches or "combs" pendant to the backbone, the combs having a number average molecular weight (Mn) of at least 5,000 or 8,000 g/mole, and wherein the comb-block HDPE has a branching index (g') of less than 0.9, or 0.85. The "polyethylene composition" will typically comprise the comb-block HDPE and some unreacted bVT-HDPE, thus, characteristics describing the "polyethylene composition" can include a composite of both components.

In order to achieve this polyethylene composition is provided in any embodiment a process wherein a bVT-HDPE is first generated, followed by incorporation of that bVT-HDPE into a forming polyethylene backbone, the whole structure referred to as a "comb" structure comprising blocks derived from the bVT-HDPE and blocks derived from the second polymerization step. Thus, also provided is a process for preparing comb-block HDPE comprising contacting, at a temperature of at least 100° C., ethylene with a first salan catalyst precursor and an activator to form bVT-HDPE having a number average molecular weight (Mn) of at least 5,000 g/mole; and contacting, at a temperature of at least 100° C., the vinyl/vinylidene-terminated high density polyethylene with ethylene and a second metallocene catalyst precursor, and an activator to form comb-block HDPE. The "contacting" may occur as two steps together in one reactor, in two separate zones in one reactor, or in separate reactors such as in series reactors.

Catalyst Precursors and Activators

The inventive process takes place in two steps or stages, each step/stage preferably requiring a different catalyst precursor in contacting the monomers. In any embodiment, the first and second contacting steps take place in the same reactor and take place concurrently in the same reactor. The first and second contacting steps can also take place in the same reactor, but at different times for multiple stage polymerizations. A first salan catalyst precursor is used in a first contacting stage or reactor until the polymerization reaction has run for a desired amount of time, followed by contacting a second metallocene catalyst with monomers. Alternatively, the first contacting may take place in a different reactor than the second contacting stage or step, such as in serial reactors where the reaction effluent from the first reactor is transferred to the second reactor, at least in part or whole, in a continuous process. In such a serial reaction scheme, a first salan catalyst precursor can be added to the first reactor, followed by addition of a second metallocene to a second reactor along with the effluent from the first reactor. These polymerization steps may take place at the same or different temperatures, and may take place at the same or different pressures, preferably a pressure of at least 1 or 2 MPa, or within a range from 1 or 2 MPa to 4 or 6 or 8 MPa.

In any embodiment, the inventive process takes place in a single reactor process with premade the vinyl/vinylidene-terminated high density polyethylene. Preferably the premade vinyl/vinylidene-terminated high density polyethylene is dissolved in a solvent and added into the reaction in solution form.

In any case, the first stage is preferably the stage in which a bVT-HDPE is formed and thus a catalyst precursor that favors the formation of branched vinyl/vinylidene-terminated polyolefin is desirable, most preferably a salan catalyst precursor. A "salan" catalyst precursor is a Group 3 to 6 organometallic compound having ligands consisting of two phenols and two Schiff bases (aryl-imine groups), where the nitrogens are preferably bridged to one another through a divalent hydrocarbyl group, and most preferably where additionally the phenol groups and aryl-imine groups are bridged together as one ligand with four coordination sites to the metal.

In any embodiment, the catalyst precursor useful in forming bVT-HDPE is a salan catalyst such as described in U.S. Pat. No. 8,957,171 and U.S. Pat. No. 9,045,568. In any embodiment, the first salan catalyst precursor is selected from (I):

(I)

where each solid line represents a chemical bond, a "chemical bond" being an attractive force between atoms strong enough to permit the combined aggregate to function as a unit;

M is a Group 3, 4, 5 or 6 transition metal chemically bonded to each oxygen atom and each nitrogen atom, preferably a Group 4 metal;

each X is, independently, a univalent C1 to C20 hydrocarbyl radical, a functional group comprising elements from Groups 13 to 17 of the periodic table of the elements, or X1 and X2 join together to form a C4 to C62 cyclic or polycyclic ring structure;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a C1 to C4, or C6, or C10, or C20, or C30, or C40 hydrocarbyl, a functional group comprising elements from Group 13 to 17 of the periodic table of the elements, or independently, may join together to form a C4 to C10, or C16, or C20, or C30, or C40, or C50, or C62 cyclic or polycyclic ring structure, or a combination thereof; and Y is a divalent hydrocarbyl radical chemically bonded to and bridging between both of the nitrogen atoms $N^1$ and $N^2$, preferably a C1 to C6 divalent hydrocarbyl radical. In any embodiment, two or more of $R^1$ to $R^{28}$ may independently join together to form a C4 to C10, or C16, or C20, or C30, or C40, or C50, or C62 cyclic or polycyclic ring structure.

The terms "hydrocarbyl radical," "hydrocarbyl" and "hydrocarbyl group" are used interchangeably throughout this document unless otherwise specified and is defined to be C1 to C70 radicals, or C1 to C20 radicals, or C1 to C10 radicals, or C6 to C70 radicals, or C6 to C20 radicals, or C7 to C20 radicals, or C1 to C6 radicals that may be linear, branched, or cyclic alkyls where appropriate (aromatic or non-aromatic); and includes hydrocarbyl radicals substituted with other hydrocarbyl radicals and/or one or more functional groups comprising elements from Groups 13 to 17 of the periodic table of the elements. In addition two or more such hydrocarbyl radicals may together form a fused ring system, including partially or fully hydrogenated fused ring systems, which may include heterocyclic radicals.

In any embodiment, M is a Group 4 metal, or M is Hf, Ti and/or Zr, or M is Hf or Zr. In any embodiment, each of $X^1$ and $X^2$ is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In any embodiment, $X^1$ and $X^2$ together form a part of a fused ring or a ring system having from 4 to 6, or 10, or 20, or 30, or 40, or 50, or 62 carbon atoms.

In any embodiment, each of $X^1$ and $X^2$ is independently selected from the group consisting of halides, alkyl radicals having from 1 to 7 carbon atoms, benzyl radicals, or a combination thereof.

In any embodiment, Y is a divalent C1 to C3, or C10, or C14, or C20, or C40 hydrocarbyl radical comprising a portion that comprises a linker backbone comprising from 1 to 18 carbon atoms linking or bridging between nitrogen atoms $N^1$ and $N^2$. In any embodiment, Y is a C1 to C20 hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a C1 to C18 hydrocarbyl. In any embodiment, Y is selected from the group consisting of ethylene (—CH$_2$CH$_2$—) and 1,2-cyclohexylene, and/or —CH$_2$CH$_2$CH$_2$— derived from propylene. In any embodiment, Y is —CH$_2$CH$_2$CH$_2$— derived from propylene.

In any embodiment, each X is, independently, a halogen or a C1 to C7 hydrocarbyl radical.

In any embodiment, each X is a benzyl radical. In any embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, hydrogen, a halogen, or a C1 to C30 hydrocarbyl radical, or a C1 to C10 hydrocarbyl radical. In any embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is a methyl radical, a fluoride (F), or a combination thereof.

In any embodiment, M is Zr or Hf; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In any embodiment, M is Zr or Hf; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In any embodiment, M is Zr or Hf; $X^1$ and $X^2$ are benzyl radicals; $R^1$ and $R^{14}$ are methyl radicals; $R^4$ and $R^{17}$ are fluoride (F) functional groups; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In any embodiment, M is Zr or Hf; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are tert-butyl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In any embodiment, M is Zr or Hf; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

The second stage or step of the process is, preferably, one in which a backbone polyethylene is formed in the presence of the reactor effluent of the first stage or step, which contains bVT-HDPE. Thus, desirably the second metallocene catalyst is chosen that favors the incorporation of vinyl/vinylidene-terminated polyolefins as a macromonomer unit while forming the backbone polyolefin. In any embodiment, the second metallocene precursor is selected from $C_s$ symmetric bis-cyclopentadienyl Group 4 complexes and mono-cyclopentadienyl Group 4 complexes. Most preferably, the second metallocene catalyst precursor may be selected from those having the following structure (II):

(II)

wherein:
M is a Group 4 metal, preferably Zr or Hf;
each X is independently a halogen or C1 to C10 alkyl, or C6 to C10 aryl;
"A" is a methylene or ethylene, wherein the ethylene has two $R^1$ groups on each carbon, or
"A" is a silane;
each $R^1$ is independently selected from hydrogens, C1 to C10 alkyls, and C6 to C10 aryls;
each of $R^2$ to $R^{13}$ is independently selected from hydrogens, C1 to C10 alkyls, C6 to C10 aryls, C7 to C24 alkylaryls, and C7 to C24 arylalkyls;
preferably each of $R^3$ and $R^8$ are a C2 to C6 iso- or tert-alkyls, and the other R groups are hydrogen; and
wherein $R^2$ and $R^3$ may form a C4 to C7 saturated or unsaturated ring.

Also, in any embodiment, the second metallocene precursor may, preferably, be selected from those having the following structure, especially when branched HDPE is desired for the backbone polyolefin (III):

(III)

wherein:
M is a Group 4 metal, preferably Ti;
each X is independently a halogen or C1 to C10 alkyl, or C6 to C10 aryl;
"A" is a C1 to C6 alkylene, most preferably a methylene or ethylene, wherein the ethylene has two $R^1$ groups on each carbon, or "A" is a silane;
Q is a heteroatom or hydrocarbyl radical; preferably a carbon, nitrogen, silicon, or phosphorous; wherein "n" is 1, 2, or 3;
each $R^1$ is chemically bonded to one or more carbons on the alkylene, or to the silane, and is independently selected from hydrogen, C1 to C10 alkyls, and C6 to C10 aryls;
each of $R^2$ to $R^5$ is independently selected from hydrogens, C1 to C10 alkyls, C6 to C10 aryls, C7 to C24 alkylaryls, and C7 to C24 arylalkyls; and wherein $R^6$ is selected from C1 to C10 alkyls, and C4 to C20 saturated or unsaturated rings.

The catalyst precursor must also be combined with at least one activator to effect polymerization of the ethylene and/or ethylene and bVT-HDPE macromonomers, wherein the activator preferably comprises a non-coordinating borate anion and a bulky organic cation. In any embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra(perfluoronaphthyl)borate anion.

Preferably the bulky organic cation is selected from the following structures (IVa) and (IVb):

(IVa)

(IVb)

wherein each R group is independently hydrogen, a C6 to C14 aryl (e.g., phenyl, naphthyl, etc.), a C1 to C10 or C20 alkyl, or substituted versions thereof; and more preferably at least one R group is an C6 to C14 aryl or substituted versions thereof.

In any embodiment, the bulky organic cation is a reducible Lewis Acid, especially a trityl-type cation (wherein each "R" group in (IVa) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (IVb) is hydrogen. Exemplary bulky organic cations of this type in general include ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers. The catalyst may be formed before combining with monomers, after combining with monomers, or simultaneous therewith.

Polymerization Process

The inventive polyethylene composition comprising the comb-block HDPE can be made by any polymerization process such as those referred to as gas phase processes, slurry process, and/or solution processes, and any of these can be combined in serial reactor processes. But most preferably the inventive process is a so-called solution process, and most preferably the process takes place in two reactors in series where the reactants, preferably ethylene, the catalyst precursor, and activator are kept under solution polymerization conditions. For example, copolymerizations are preferably carried out in one or more single-phase, liquid-filled, stirred tank reactors with continuous flow of feeds to the system and continuous withdrawal of products under steady state conditions. When more than one reactor is used, the reactors are preferably operated in a serial configuration. Advantageously, the reactors produce polymers with different properties, such as different molecular weights, or different monomer compositions, or different levels of long-chain branching, or any combinations thereof due to the use of different catalysts in each reactor.

All polymerizations can be performed in a system with a solvent comprising any one or more of C4 to C12 alkanes and/or the olefin monomers, using soluble (soluble in carrier solvent or in reactor solvent) metallocene catalysts or other single-site catalysts and discrete, non-coordinating borate anions as co-catalysts. A homogeneous dilute solution of tri-n-octyl aluminum in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer re-insertions that create long chain branching, if so desired. In any embodiment, the reactor temperature in either the first stage/reactor and/or second stage/reactor is greater than 100, or 105, or 110° C., or within a range from 100, or 105, or 110° C. to 130, or 140, or 150, or 160° C. This combination of a homogeneous, continuous, solution process helps to ensure that the polymer products have narrow composition and sequence distributions.

In any embodiment of the first step of the inventive process, the salan catalyst precursor and activator are combined under suitable conditions as described here, preferably in a first stage or first reactor, with ethylene, and optionally other comonomers as disclosed herein, to produce a bVT-HDPE. In any embodiment, the bVT-HDPE block has a branching index (g') of less than 0.95, or 0.9; or within a range from 0.8, or 0.85 to 0.9, or 0.95. Also, in any embodiment the level of allyl terminal groups (vinyl and/or vinylidene) is greater than 90%, or 95% relative to all unsaturated chain ends of the vinyl/vinylidene-terminated polymers. Also, in any embodiment, the bVT-HDPE has a number average molecular weight (Mn) of at least 5,000, or 8,000 g/mole; or within a range from 5,000, or 8,000 g/mole to 20,000, or 25,000, or 30,000 g/mole, and an Mw/Mn value within a range from 2.0, or 2.1, or 2.2 to 2.8, or 3.0, or 3.2.

The bVT-HDPE is then combined in a second stage or reactor with additional ethylene to form the comb-block HDPEs. The bVT-HDPE is a "macromonomer" in further co-polymerization with ethylene and the second metallocene catalyst precursor in the second stage or reactor. Because salan catalyst is also still present, it will continue to polymerize ethylene in the second stage or reactor so a certain amount of bVT-HDPE will be present in the final product, and/or, in any case, some un-reacted bVT-HDPE will still be present.

In any embodiment, the reactor(s) can be maintained at a pressure in excess of the vapor pressure of the reactant mixture to keep the reactants in the liquid phase. In this manner the reactors can be operated liquid-full in a homogeneous single phase. Ethylene (as well as optional propylene, C4 to C12 α-olefins and/or dienes) can be combined into one stream and then mixed with a solvent stream. A solution of a tri-n-octyl aluminum scavenger in a desirable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In another embodiment, cooled isothermal reactors can be used that do not require feed chilling.

As mentioned above, optional "dienes" may be added to the polymerization medium, including so-called "dual-polymerizable dienes" and "non-conjugated dienes". In any embodiment, the "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and C8-C12 alpha-omega linear dienes (e.g., 1,7-heptadiene and 1,9-decadiene), and is most preferably 5-vinyl-2-norbornene. In any embodiment, the mole percent of the dual-polymerizable diene that is combined (i.e., present in the feed leading to the polymerization reactor) is less than 0.30, or 0.28, or 0.26 mol % relative to the other monomers, or within a range from 0.05 to 0.26 or 0.28 or 0.30 mol %. The polyethylene formed therefrom may comprise "dual-polymerizable diene derived monomer units".

In any embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. More preferably, the non-conjugated diene is selected from C7 to C30 cyclic non-conjugated dienes.

Most preferably, however, the polyethylene composition (preferably comprising the comb-block HDPE) consists essentially of, or consists of, ethylene-derived units and within a range from 0.1 to 10, or 20 wt %, by weight of the polymer, of C3 to C10 α-olefin derived units. Most preferably, dienes are absent from the polymerization process, that is, they are not purposefully combined with the ethylene, and catalyst components in any stage of the process of forming the comb-block HDPE's described herein.

The reaction mixture may be stirred aggressively by any means known in the art to provide thorough mixing over a broad range of solution viscosities. Flow rates can be set to maintain an average residence time in the reactor of 10 to 30 or 45 mins. On exiting the reactor the copolymer mixture may be subjected to quenching, a series of concentration steps, heat and vacuum stripping and pelletization, or alternatively, may be fed to a subsequent reactor where another α-olefin such as ethylene will be copolymerized with the bVT-HDPE macromonomer from the first reactor, or fed to a line containing solution or slurry (or a combination of both) polyolefin where intimate mixing may occur. Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The polyethylene composition comprising the comb-block HDPE can be recovered from the effluent of either the first polymerization step or the second polymerization step by separating the polymer from other constituents of the effluent using conventional separation means. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be removed from the plant for physical blending with polyolefin. If in situ blends are preferred, the removal of solvent takes place after intimate mixing with the solution or slurry phase polyolefin.

The lean phase and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise any internally unsaturated olefins which are difficult to polymerize would gradually build up in the lean phase and recycle streams. Any adverse effects on the polymerization activity may be mitigated by removing these olefins from the recycle stream and/or encouraging their incorporation in the polymer, favored by high polymerization temperatures. Such methods are well known in the art.

In any embodiment, the inventive polyethylene composition can be produced in an industrial scale process. Preferably the catalyst productivity is 20,000 kg polymer per kg of catalyst or more, more preferably 40,000 kg polymer per kg of catalyst or more.

Polyethylene Product

Regardless of the process, disclosed herein is a polyethylene composition comprising a comb-block HDPE comprising a polyethylene backbone, and one or more branched high density polyethylene combs pendant to the backbone, the combs having a number average molecular weight (Mn) of at least 5,000, or 8,000 g/mole, or within a range from 5,000, or 8,000 g/mole to 20,000, or 25,000, or 30,000 g/mole, wherein the polyethylene composition has a branching index (g') of less than 0.9, or 0.85, or within a range from 0.5, or 0.55 to 0.85 or 0.9. The polyethylene composition can be described in any embodiment as comprising (or consisting essentially of, or consisting of) a "comb-block HDPE" that includes some unreacted bVT-HDPE, wherein the density as described above is at least 0.93 g/cm$^3$. In terms of the comb-block HDPE itself, the g' value in any embodiment is within a range from 0.4, or 0.5 to 0.6, or 0.7, or 0.8.

In any embodiment, such polyethylene is produced and/or processed in the absence of a chemical modification step (i.e., "post-reactor modification") such as, for example, by oxygen tailoring by extrusion in the presence of oxygen, or other means of effecting crosslinking of the polyethylene such as exposure to gamma-ray and/or x-ray irradiation, or addition of other cross-linking agents.

In any embodiment, the inventive polyethylene composition has a bimodal molecular weight distribution, wherein the GPC-4D chromatograph (as described herein, such as in FIG. 1) exhibits a positive and negative inflection, or two "peaks" and one "trough." In any embodiment, the polyethylene is a combination of a comb-block HDPE component and an unreacted bVT-HDPE, or a composition comprising (or consisting essentially of, or consisting of) the two components.

The inventive polyethylene composition can be described by its molecular weight characteristics as determined by GPC-4D described herein. In any embodiment, the inventive polyethylene has a number average molecular weight (Mn) within a range from 25,000, or 30,000 g/mole to 80,000, or 90,000, or 100,000 g/mole. In any embodiment, the polyethylene composition has a weight average molecular weight (Mw) within the range from 150,000, or 200,000 g/mole to 500,000, or 550,000, or 600,000, or 700,000 g/mole. In any embodiment, the polyethylene composition has a z-average molecular weight (Mz) of greater than 400,000, or 450,000, or 500,000 g/mole, or within a range from 400,000, or 450,000, or 500,000 g/mole to 1,000,000, or 1,500,000, or 2,000,000 g/mole. In any embodiment the polyethylene composition as a molecular weight distribution (Mw/Mn) of greater than 5, or 5.5, or 6; or within a range from 5, or 5.5, or 6 to 10, or 11, or 12, or 13, or 14, or 18, or 20. In any embodiment, the polyethylene composition as an Mz/Mw value within a range from 1.4, or 1.5 to 2.2 or 2.4 or 2.6 or 3.0. Finally, in any embodiment the polyethylene composition has an Mz/Mn value of greater than 9.5, or 10, or within a range from 9.5, or 10, to 18, or 20, or 24.

As characterized by $C^{13}$ NMR, the inventive polyethylene composition has within a range from 1, or 1.2, or 1.3 to 2, or 3, or 4 branches per 1000 carbon atoms in any embodiment. Further, in any embodiment the polyethylene composition has a density of greater than 0.935, or 0.94 g/cm$^3$, or within a range from 0.935, or 0.94 g/cm$^3$ to 0.955, or 0.960, or 0.965, g/cm$^3$.

The inventive polyethylene composition can also be characterized by its thermodynamic behavior. In any embodiment the polyethylene has a peak melting point temperature ($T_{m2}$) within a range from 125, or 128, or 130° C. to 135, or 138, or 140° C. (the melt peak on the first cycle is not used here). Also in any embodiment the polyethylene composition has a heat of melting ($\Delta H_m$) within a range from 180, or 185, or 190 J/g to 215, or 220, or 225, or 230, or 235, or 240, or 245 J/g.

The polyethylene composition described herein is useful in a number of applications, and is especially useful as an additive or modifier for other types of polyolefins, especially other HDPE's that are typically linear. More particularly, the inventive polyethylene composition may be a modifier for polyethylene, polypropylene or blend of polyethylene/polypropylene, or a linear and/or bimodal HDPE. In any embodiment the polyethylene is modifier for another polyolefin composition comprising within a range from 0.05, or 0.5, or 1 wt % to 6, or 7.5, or 10 wt % by weight of the polyethylene composition. Desirable uses include pipes and conduits, and other molded articles of manufacture. Other uses include blow molded articles, especially for large articles, and film making, especially blown films. The inventive polyethylene may also be useful in foamed articles.

The various descriptive elements and numerical ranges disclosed herein for the inventive polyethylene composition and process to make such polyethylene composition can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Molecular Weight and Branching Determinations

Both GPC-3D and GPC-4D methods were used as described herein to determine Molecular weights (number average molecular weight (Mn), weight average molecular weight (Mw), and z-average molecular weight (Mz)). The bVT-HDPE materials made in the first reactor were characterized with GPC-3D. The comb-block HDPE and linear bimodal HDPE where characterized using GPC-4D. The g' calculation method used for both instruments is the same (based on IV), so is the light scattering detection method for both. The molecular weights were measured by a DRI (differential refractive index) detector in GPC-3D and by a IRS (Infrared, generation 5) detector in GPC-4D. They have been cross-calibrated and result in nearly the same values for a given polymer.

GPC-3D values were determined using a Polymer Laboratories Model 220 high temperature GPC-SEC equipped with on-line differential refractive index (DRI), light scattering (LS), and viscometer (VI) detectors (so called GPC-3D, Gel Permeation Chromatography-3 Detectors). It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the size exclusion chromatography (SEC) columns was directed into the miniDAWN (Wyatt Technology, Inc.) optical flow cell and then into the DRI detector, or IR detector. The DRI detector was an integral part of the Polymer Laboratories SEC. The viscometer was inside the SEC oven, positioned after the DRI detector. The details of these detectors, as well as their calibrations, have been described by, for example, T. Sun, P. Brant, R. R. Chance, and W. W. Graessley, in 34(19) MACROMOLECULES, 6812-6820 (2001).

GPC-4D values were determined using Polymer Char GPC-IR. GPC-IR is a high temperature Gel Permeation Chromatograph or Size Exclusion Chromatograph (GPC/SEC) with an infrared detector, a built-in viscometer and a Multi-Angle Light Scattering (DAWN™ HELEOS™ II 8 or 18 angle of Wyatt Technology). This is also called GPC-4D, four detectors, since infrared detector measures both the concentration and composition. Counting concentration, composition, along with the viscosity from viscometer and the coil dimension from MALS (multi-angle light scattering), there are four parameters being measured using GPC-IR, hence, GPC-4D.

In all cases solvent for the GPC was prepared by dissolving 6 grams of butylated hydroxy toluene as an antioxidant in 4 liters of Aldrich reagent grade 1,2,4-trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this description and the claims thereto (dn/dc)=0.104 for propylene polymers and 0.1 otherwise. Units of parameters used throughout this description of the SEC method are: concentration is expressed in g/cm³, molecular weight is expressed in g/mol, and intrinsic viscosity ("IV", or mathematically expressed as "[η]") is expressed in dL/g.

The light scattering detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, (1971)):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for polyethylene, 0.0015 for butene polymers and 0.001 otherwise), (dn/dc)=0.109 for polyethylene, 0.098 for butene polymers and 0.1 otherwise (data for polyethylene from J. Pope and B. Chu, 17 MACROMOLECULES, 2633 (1984)), P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 135° C. and λ=690 nm.

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration and was determined from the DRI output.

The branching index ($g'_{vis}$, or simply g') is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits. The branching index g' is defined as:

$$g' = \frac{[\eta]_{avg}}{kM_v^\alpha}$$

The intrinsic viscosity of the linear polymer of equal molecular weight and same composition was calculated using the Mark-Houwink equation. For purpose of this invention and claims thereto, α=0.695 and k=0.000579 for linear ethylene homo-polymers are used. Linear homo-polyethylene was used for g' calculation without considering the comonomer content. $M_V$ is the viscosity-average molecular weight based on molecular weights determined by LS analysis. The molecular weight data reported here are those determined using GPC DRI detector, and molecular weight data reported here for ethylene/macromonomer copolymers are those determined using GPC light scattering detector, unless otherwise noted. The molecular weight data reported here are those determined using a GPC DRI detector, and molecular weight data reported here for ethylene/macromonomer copolymers are those determined using GPC light scattering detector, unless otherwise noted.

Viscosity was measured using a Brookfield Viscometer according to ASTM D-3236.

Carbon 13 NMR Determinations

In conducting the $^{13}$C NMR investigations, samples were prepared by adding 0.3 g sample to approximately 3 g of tetrachloroethane-d2 in a 10 mm NMR tube. The samples were dissolved and homogenized by heating the tube and its contents to 150° C. The data were collected using a Varian spectrometer, with corresponding $^1$H frequencies of either 400 or 700 MHz (in event of conflict, 700 MHz shall be used). The data were acquired using nominally 4000 transients per data file with a 10 second pulse repetition delay. To achieve maximum signal-to-noise for quantitative analysis, multiple data files were added together. The spectral width was adjusted to include all the NMR resonances of interest and free induction decays ("FID's") were collected containing a minimum of 32K data points. The samples were analyzed at 120° C. in a 10 mm broad band probe.

Differential Scanning Calorimetry

Melting temperature ($T_{m2}$) was measured using Differential Scanning Calorimetry (DSC) using commercially available equipment such as a TA Instruments Q200 DSC. Typically, 6 to 10 mg of the sample, that has been stored at room temperature for at least 48 hours, was sealed in an aluminum pan and loaded into the instrument at room temperature. The sample was equilibrated at 25° C., and then cooled at a cooling rate of 10° C./min to −80° C., to obtain heat of crystallization ($T_c$). The sample was held at −80° C. for 5 min and then heated at a heating rate of 10° C./min to 25° C. The glass transition temperature ($T_g$) was measured from the heating cycle, where the sample was equilibrated at 25° C., then heated at a heating rate of 10° C./min to 150° C. The endothermic melting transition, if present, was analyzed for onset of transition and peak temperature. The melting temperatures reported ($T_{m2}$) are the peak melting temperatures from the second heat unless otherwise specified. For samples displaying multiple peaks, the melting point (or melting temperature) is defined to be the peak melting temperature (i.e., associated with the largest endothermic calorimetric response in that range of temperatures) from the DSC melting trace. The $T_{m2}$ was measured to within ±0.2° C.

The percent crystallinity of the bVT-HDPE (and the combs pendant to the polyolefin backbone by inference) is calculated using the following equation:

% Crystallinity=([ΔH$_m$−ΔH$_c$]/ΔH$_m$)·100%

In this equation, the heat of melting and cold crystallization are in terms of J/g. The term ΔH$_m$ is a reference value and represents the heat of melting if the polymer were 100% crystalline. This reference heat of melting has been established for each of the commonly used polymers, and for polyethylene the ΔH$_m$ is 288 J/g (A. Wlochowicz and M. Eder, 25 POLYMER, 1268 (1984)).

Extensional Rheometry

Figure 3:
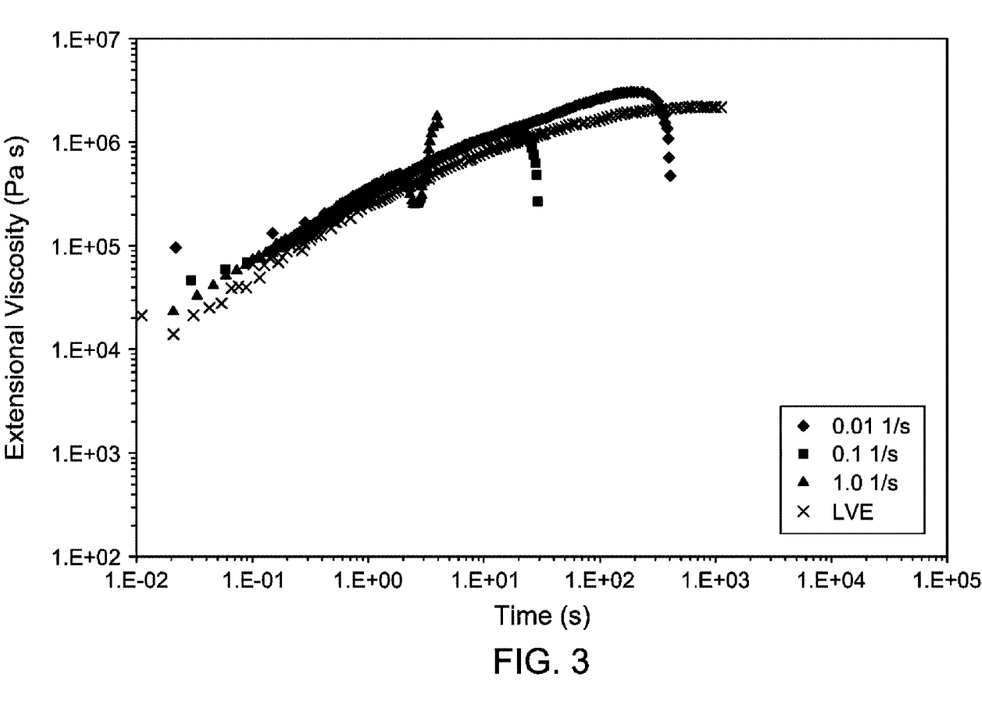
FIG. 3 shows elongational viscosity traces at 0.01, 0.1, and 1 sec$^{-1}$ shear rate for the linear HDPE used as the base polymer in the blend experiments.
Figure 4:
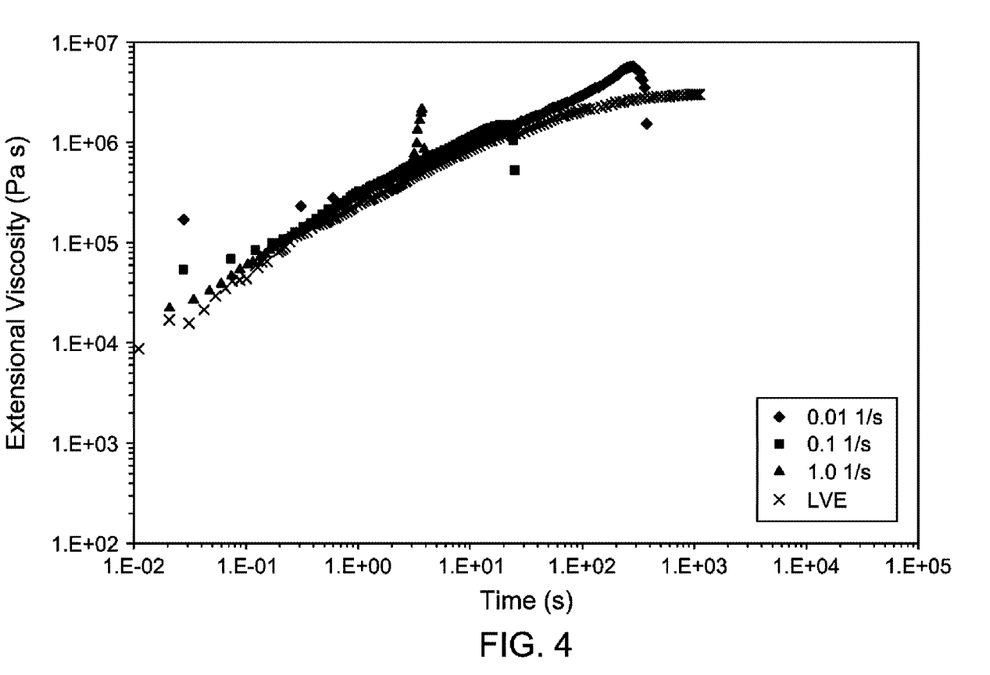
FIG. 4 shows elongational viscosity traces at 0.01, 0.1, and 1 sec$^{-1}$ shear rate for the linear HDPE used as the base polymer in a blend with 5 wt % of the inventive polyethylene composition.

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. No. 6,578,413 and U.S. Pat. No. 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). Strain hardening occurs when a polymer is subjected to uniaxial extension and the transient extensional viscosity increases more than what is predicted from linear viscoelastic theory. Strain hardening is observed as an abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples are also tested using transient steady shear conditions and matched to the extensional data using a correlation factor of three. This provides the linear viscoelastic envelope (LVE). Rectangular sample specimens with dimensions approximately 18.0 mm long× 12.70 mm wide are mounted on the SER fixture. Samples are generally tested at three Hencky strain rates: 0.01 s$^{-1}$, 0.1 s$^{-1}$ and 1 s$^{-1}$. The testing temperature is 150° C. The polymer samples were prepared as follows: The sample specimens were hot pressed at 190° C., mounted to the fixture, and equilibrated at 150° C. The results of these tests on the Example and comparative samples are shown in FIG. 3 and FIG. 4.

Synthesis of the Polyethylene Composition

The polyethylenes in Examples 1 to 2 were made in a continuous stirred tank reactor system with two reactors configured in series. The first reactor was a 0.5 liter and the second reactor was a 1 liter. The autoclave reactors were equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. All feeds (solvent and monomers) were pumped into the reactors by Pulsa™ feed pumps and the flow rates were controlled using Coriolis mass flow controller (Quantim™ series from Brooks) except for the ethylene, which flowed as a gas under its own pressure through a Brooks flow controller. Similarly, $H_2$ feed was controlled using a Brooks flow controller. Ethylene and $H_2$ feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons. Similarly, catalyst solution was fed to the reactor using an ISCO syringe pump through a separated line. Isohexane (used as solvent), and monomers (e.g., ethylene) were purified over beds of alumina and molecular sieves. Toluene for preparing catalyst solutions was purified by the same technique. Conditions are otherwise as in Table 1.

The content (include polymer produced and active catalyst) of the first reactor flows directly into the second reactor. Additional solvent and monomers were supplied to the second reactor. Polymer exited the second reactor through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. Catalyst productivity was calculated as the yield of per kg of catalysts fed into both reactors.

The catalyst precursor used in the first reactor for the production of bVT-HDPE was 6,6'-((ethane-1,2-diylbis (methylazanediyl)bis(methylene)) bis(2-(9H-carbozol-9-yl)-4-methylphenoxide) hafnium (IV) dibenzyl precursor (Catalyst 1) and the activator was dimethylanilinium tetrakis (pentafluorophenyl) borate. The catalyst precursor used in the second reactor to copolymerize ethylene and bVT-HDPE was bis(p-triethylsilylphenyl) carbyl(cyclopentadienyl)(2,7-di-t-butylfluorenyl) hafnium dimethyl (Catalyst 2) activated by dimethylanilinium tetrakis(pentafluorophenyl) borate. Both catalyst precursors were pre-activated with the activator at a molar ratio of about 1:1 in 900 ml of toluene. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency.

Figure 1:
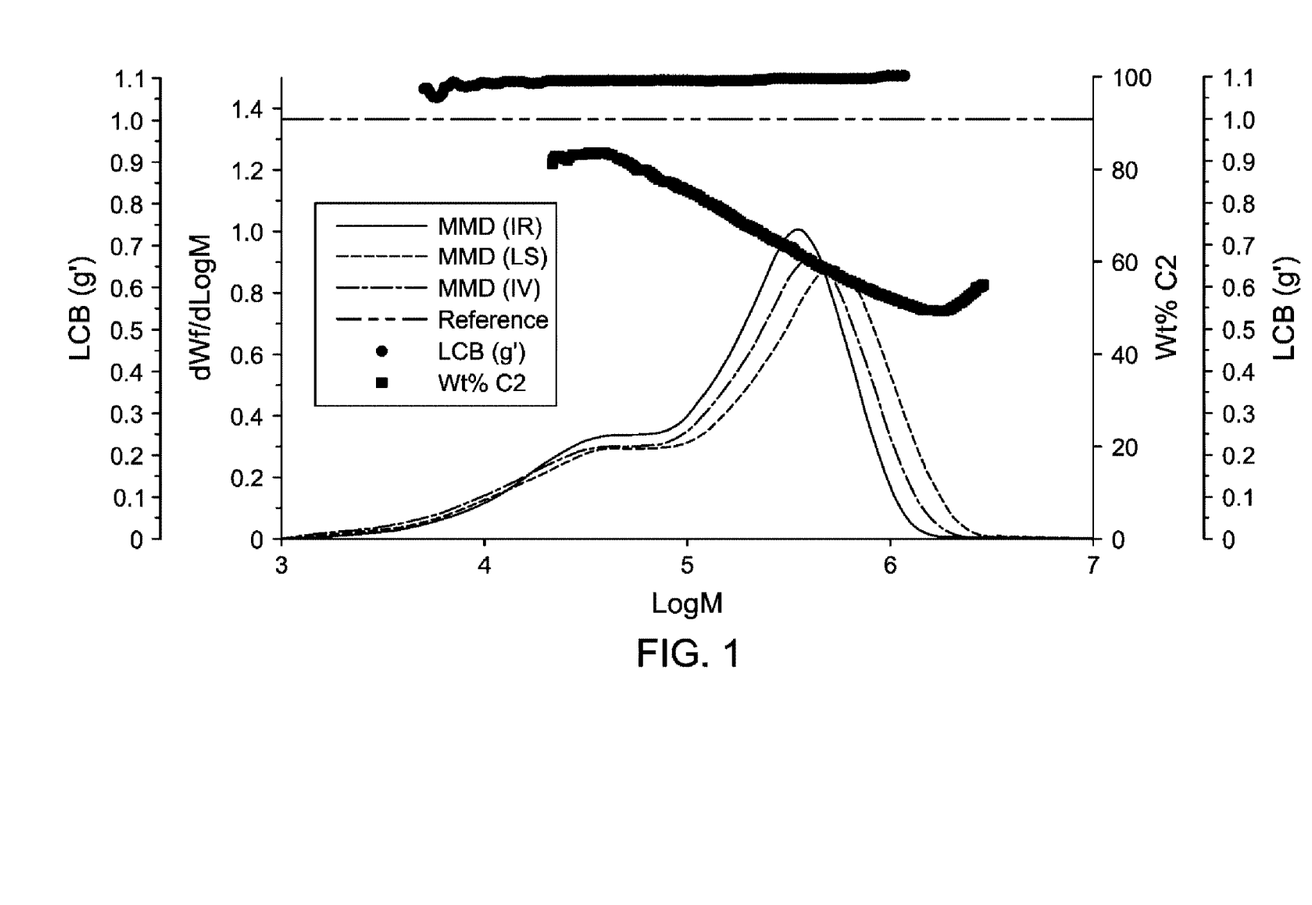
FIG. 1 is a GPC chromatogram with overlay traces showing the degree of branching (g'), the weight percent ethylene-derived units, as well as the molecular weight profile (three separate traces of IR, LS, and IV) of the polyethylene composition.

In Examples 1 and 2, solvent, preactivated Catalyst 1 solution, scavenger solution and ethylene were fed into the first reactor to produce bVT-HDPE. Then the contents of the first reactor were transferred into the second reactor. Preactivated catalyst 2 solution, ethylene and additional solvent were fed into the second reactor. The final product was collected from the second reactor. The catalyst feed rate was adjusted to achieve the yield and monomer conversion. In Table 1, polymerization conditions and characterization results for vinyl/vinylidene-terminated polyethylene from Reactor 1 are tabulated. The GPC-4D molecular weight and composition (from infrared detector) plots for Example 1 are shown in FIG. 1. There are no gels in both examples and 100% recovery was achieved during the GPC testing. Both show distinct bimodal MWD and low g'. The low molecular weight component appears to be the un-incorporated bVT-HDPE since it has the same branching index g' as that coming out from the first reactor. Although there are significant amounts of low molecular weight polyethylene present in the final product, these low molecular weight components are finely dispersed in the final product. The bimodal AFM micrograph of Example 1 showed no phase separation and no heterogeneous crystallization can be seen. The characterization results of Examples 1 and 2 are listed in Table 2.

TABLE 1

Polymerization Conditions

| | Example | |
|---|---|---|
| | 1 | 2 |
| Reactor 1 | | |
| Volume (ml) | 500 | 500 |
| Temperature (° C.) | 130 | 120 |
| Ethylene feed rate (liter/minute) | 4 | 4 |
| Isohexane feed rate (g/min) | 57.7 | 57.7 |
| Catalyst 1 feed rate (mole/min) | $5.24 \times 10^{-08}$ | $5.24 \times 10^{-08}$ |
| GPC Mn (g/mole) | 13,658 | N/M |
| GPC (Mw/Mn) | 2.53 | N/M |
| LCB (long chain branching), g' | 0.887 | N/M |
| Reactor 2 | | |
| Volume (ml) | 1,000 | 1,000 |
| Temperature (° C.) | 130 | 120 |
| Ethylene feed rate (liter/min) | 2 | 2 |
| Isohexane feed rate (g/min) | 40 | 40 |
| Catalyst 2 feed rate (mole/min) | $9.42 \times 10^{-08}$ | $9.42 \times 10^{-08}$ |
| Conversion | 90.0% | 90.4% |
| Catalyst productivity (kg polymer/kg catalyst) | 43,800 | 43,100 |

TABLE 2

Characterization results of the final products

| | Example | |
|---|---|---|
| | 1 | 2 |
| DSC | | |
| Density (g/cm³) | 0.944 | 0.944 |
| Crystallization temperature (peak, ° C.) | 118.6 | 118.7 |
| Melting temperature (peak, ° C.) | 132.8 | 133.5 |
| Heat of melting (J/g) | 192.9 | 205.1 |
| GPC | | |
| Molecular weight distribution | bimodal | bimodal |
| Mn (g/mole) | 44,573 | 51,353 |
| Mw (g/mole) | 270,383 | 335,105 |
| Mz (g/mole) | 491,539 | 641,093 |
| Mw/Mn | 6.07 | 6.53 |
| $C^{13}$ NMR | | |
| Branches per thousand carbons | 1.65 | 1.5 |

Polyolefin Blends

Figure 2:
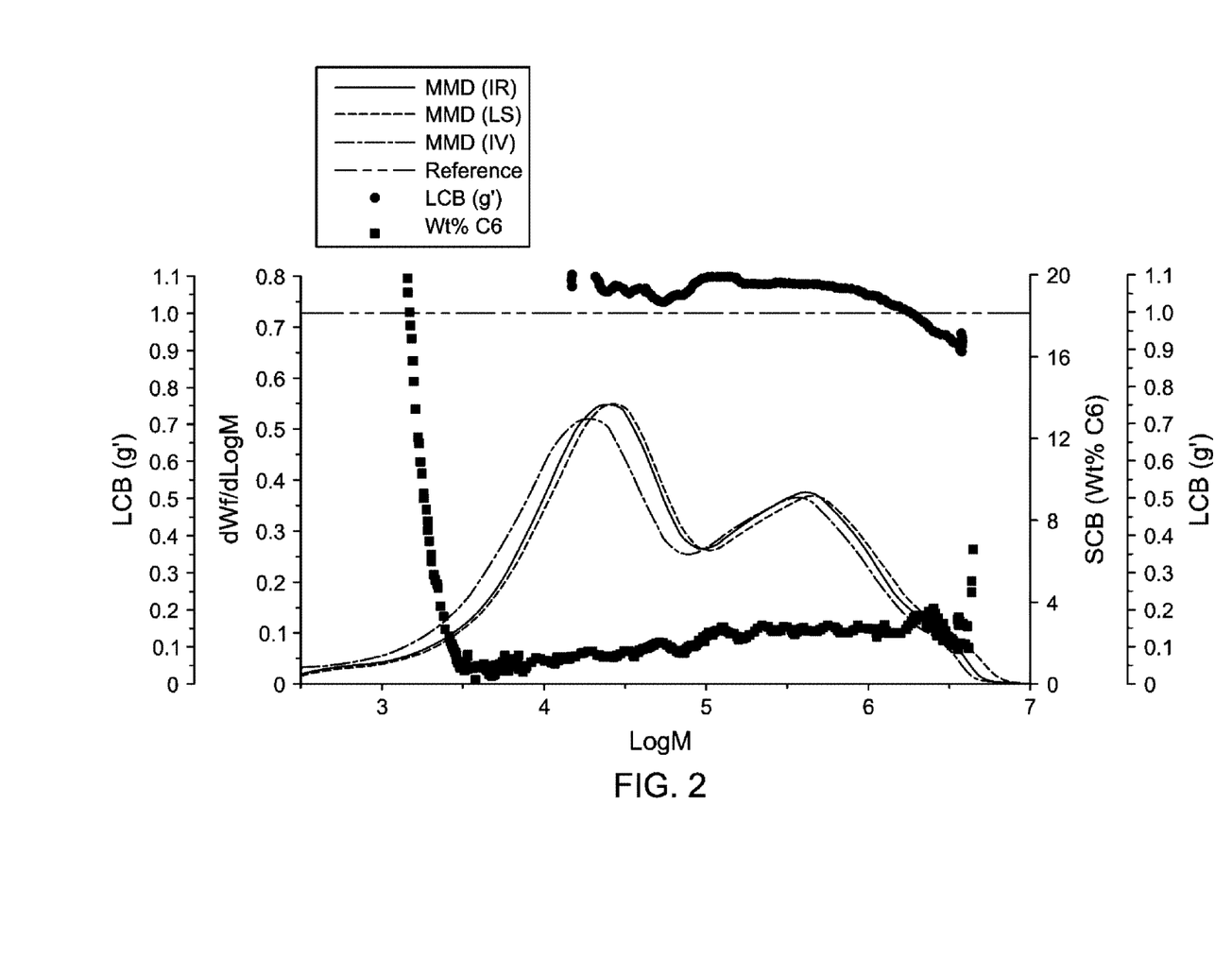
FIG. 2 is a GPC chromatogram with overlay traces showing the degree of branching (g'), the weight percent ethylene-derived units, as well as the molecular weight profile (three separate traces of IR, LS, and IV) of a linear HDPE used as the base polymer in the blend experiments.

The inventive polyethylene was tested in a blend using a linear bimodal HDPE as the primary polyolefin component. A linear bimodal HDPE (ExxonMobil Chemical Company, density of 0.95 g/cm³, Mn of 12,000 g/mole, Mw of 305,060 g/mole, Mz of 1,461,895 g/mole, with Mw/Mn of 25.4) having a g' value of 1 was used as the HDPE matrix. Its GPC-4D curve is shown in FIG. 2. Solution blending of Example 1 into this bimodal HDPE was conducted at 150° C. using dichlorobenzene (o-DCB) as the solvent at 1 wt % and 5 wt %. In each blend, 0.5 wt % of BHT antioxidant was added. Their extensional rheological responses were measured using SER (Sentmanat Extensional Rheometer) at 190° C. and the extensional flow behavior of the 0 wt % (pure linear bimodal HDPE) and 5 wt % comb-block HDPE ("polyethylene") blend is shown in FIGS. 3 and 4, respectively. Extensional flow hardening could be seen in the HDPE containing 1% and 5% of Example 1 but extensional hardening is not evident in the linear bimodal HDPE (no or only minor increase in the curve versus the LVE). The results are summarized in Table 3.

TABLE 3

Extensional Viscosities of Blends

| comp-block HDPE | Extensional Strain | Extensional Viscosity (Pa · s) | Shear Rate (1/sec) |
|---|---|---|---|
| 0 wt % | 2.5 | $2.95 \times 10^6$ | 0.01 |
| 1 wt % | 2.5 | $6.62 \times 10^6$ | 0.01 |
| 5 wt % | 2.5 | $5.60 \times 10^6$ | 0.01 |

Having described the various aspects of the polyethylene composition comprising the comb-block HDPE, and the process for making them, disclosed here in numbered paragraphs is:

P1. A polyethylene composition comprising (or consisting of, or consisting essentially of) a comb-block HDPE comprising:
  a polyethylene backbone, and one or more branched high density polyethylene combs pendant to the backbone, the combs having a number average molecular weight (Mn) of at least 5,000, or 8,000 g/mole; or within a range from 5,000, or 8,000 g/mole to 20,000, or 25,000, or 30,000 g/mole, wherein the polyethylene backbone and branched high density polyethylene combs are formed by different catalysts; and
  wherein the polyethylene composition has a branching index (g') of less than 0.9, or 0.85 and having within a range from 1, or 1.2, or 1.3 to 2, or 3, or 4 branches per 1000 carbon atoms as measured by $C^{13}$ NMR.

P2. The polyethylene composition of numbered paragraph 1, wherein the polyethylene is processed in the absence of a chemical modification step.

P3. The polyethylene composition of numbered paragraphs 1 or 2, having a bimodal molecular weight distribution.

P4. The polyethylene composition of any one of the previous numbered paragraphs, having a number average molecular weight (Mn) within a range from 30,000 g/mole to 100,000 g/mole.

P5. The polyethylene composition of any one of the previous numbered paragraphs, having a z-average molecular weight (Mz) of greater than 400,000 g/mole.

P6. The polyethylene composition of any one of the previous numbered paragraphs, having a molecular weight distribution (Mw/Mn) greater than 5.

P7. The polyethylene composition of any one of the previous numbered paragraphs, wherein the different catalysts comprise a first salen catalyst precursor and a second metallocene catalyst precursor.

P8. The polyethylene composition of any one of the previous numbered paragraphs, having a density of greater than 0.935, or 0.94 g/cm³.

P9. The polyethylene composition of any one of the previous numbered paragraphs, having a peak melting point temperature ($T_{m2}$) within a range from 125, or 128, or 130° C. to 135, or 138, or 140° C.

P10. The polyethylene composition of any one of the previous numbered paragraphs, having a heat of melting ($\Delta H_m$) within a range from 180, or 185, or 190 J/g to 215, or 220, or 225, or 230, or 235, or 240, or 245 J/g.

P11. A modifier for a polyolefin comprising within a range from 0.05 wt % to 10 wt % of the polyethylene composition of any one of the previous numbered paragraphs.

P12. A process for making the polyethylene composition of any one of the previous numbered paragraphs comprising (or consisting of, or consisting essentially of):
  contacting, at a temperature of at least 100° C., ethylene with a first salan catalyst precursor and an activator to form bVT-HDPE having a number average molecular weight (Mn) of at least 5,000 g/mole;
  contacting, at a temperature of at least 100° C., the bVT-HDPE with ethylene and a second metallocene catalyst precursor and an activator to form a comb-block HDPE;
  isolating the polyethylene composition, preferably comprising (or consisting essentially of, or consisting of) the comb-block HDPE and bVT-HDPE.

P13. The process of numbered paragraph 12, wherein the contacting steps take place is a solution polymerization process.

P14. The process of numbered paragraph 12 or 13, wherein the activator comprises a non-coordinating borate anion.

P15. The process of numbered paragraph 14, wherein the activator also comprises a bulky organic cation.

P16. The process of any one of numbered paragraphs 12 to 15, wherein the polyethylene composition is processed in the absence of post-reactor modification.

P17. The process of any one of numbered paragraphs 12 to 16, wherein the contacting steps occur in the same reactor.

P18. The process of any one of numbered paragraphs 12 to 17, wherein the first contacting step occurs in a first reactor, and the second contacting step occurs in a second reactor in series with the first reactor.

P19. The process of any one of numbered paragraphs 12 to 18, wherein the first salan catalyst precursor is selected from those having the following structure:

wherein M is a Group 3, 4, 5 or 6 transition metal;
each X is, independently, a univalent C1 to C20 hydrocarbyl radical, a functional group comprising elements from Groups 13 to 17 of the periodic table of the elements, or $X^1$ and $X^2$ join together to form a C4 to C62 cyclic or polycyclic ring structure;

each R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$ and R$^{28}$ is, independently, a hydrogen, a C1 to C40 hydrocarbyl, a functional group comprising elements from Group 13 to 17 of the periodic table of the elements, or independently, may join together to form a C4 to C62 cyclic or polycyclic ring structure, or a combination thereof; and Y is a divalent hydrocarbyl radical bridging the nitrogen atoms N$^1$ and N$^2$.

P20. The process of any one of numbered paragraphs 12 to 19, wherein the second metallocene catalyst precursor is selected from C$_s$ symmetric bis-cyclopentadienyl Group 4 complexes and mono-cyclopentadienyl Group 4 complexes.

P21. The process of any one of numbered paragraphs 12 to 20, wherein the second metallocene catalyst precursor is selected from those having the following structure:

wherein M is a Group 4 metal;
each X is independently a halogen or C1 to C10 alkyl, or C6 to C10 aryl;
"A" is a methylene or ethylene, wherein the ethylene has two R$^1$ groups on each carbon, or "A" is a silane;
each R$^1$ is independently selected from hydrogens, C1 to C10 alkyls, and C6 to C10 aryls;
each of R$^2$ to R$^{13}$ is independently selected from hydrogens, C1 to C10 alkyls, C6 to C10 aryls, C7 to C24 alkylaryls, and C7 to C24 arylalkyls; and
wherein R$^2$ and R$^3$ may form a C4 to C7 saturated or unsaturated ring.

P22. The process of any one of numbered paragraphs 12 to 21, wherein the second metallocene precursor is selected from those having the following structure:

wherein:
M is a Group 4 metal;
each X is independently a halogen or C1 to C10 alkyl, or C6 to C10 aryl;
"A" is a C1 to C6 alkylene, or "A" is a silane;
Q is a heteroatom or hydrocarbyl radical; wherein "n" is 1, 2 or 3;

each R$^1$ is independently selected from hydrogen, C1 to C10 alkyls, and C6 to C10 aryls;
each of R$^2$ to R$^5$ is independently selected from hydrogens, C1 to C10 alkyls, C6 to C10 aryls, C7 to C24 alkylaryls, and C7 to C24 arylalkyls; and
wherein R$^6$ is selected from C1 to C10 alkyls, and C4 to C20 saturated or unsaturated rings.

Also disclosed is the use of a salan and metallocene catalyst as described herein in a process to form a polyethylene composition.

Also disclosed is the use of a polyethylene composition as a modifier in a composition.

The phrase "consisting essentially of" in a polymer composition or components in a process means that no other additives, monomers, and/or catalysts are present in the composition or process being referred to other than those named, or, if present, are present to a level no greater than 0.5, or 1.0, or 2.0, or 4.0 wt % by weight of the composition; in a polymer, the phrase "consisting essentially of" means that only the named monomer-derived units are present, and if any others are present, they are present to a level no greater than 0.5, or 0.2 wt % by weight of the polymer; and also in a process, "process . . . consisting essentially of" means that no other major process step is present that effects the formation of covalent chemical bonds between two or more moieties, for example, exposure to external radiation, addition of reactive cross-linking agents, another polymerization step, etc., but minor process features and changes that effect the rate of covalent bond formation as is claimed may be present, such as, for example, a change in temperature or pressure or concentration of components.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process for making a polyethylene composition comprising:
contacting, at a temperature of at least 100° C., ethylene with a first salan catalyst precursor and an activator to form branched vinyl/vinylidene-terminated high density polyethylene ("bVT-HDPE") having a number average molecular weight (Mn) of at least 5,000 g/mole;
contacting, at a temperature of at least 100° C., the bVT-HDPE with ethylene and a second metallocene catalyst precursor and an activator to form a comb-block HDPE; and
isolating a polyethylene composition.

2. The process of claim 1, wherein the contacting steps take place is a solution polymerization process.

3. The process of claim 1, wherein the activator comprises a non-coordinating borate anion.

4. The process of claim 3, wherein the activator also comprises a bulky organic cation.

5. The process of claim 1, wherein the contacting steps occur in the same reactor.

6. The process of claim 1, wherein the first contacting step occurs in a first reactor, and the second contacting step occurs in a second reactor in series with the first reactor.

7. The process of claim 1, wherein the first salan catalyst precursor is selected from those having the following structure:

wherein M is a Group 3, 4, 5 or 6 transition metal;

each X is, independently, a univalent C1 to C20 hydrocarbyl radical, a functional group comprising elements from Groups 13 to 17 of the periodic table of the elements, or $X^1$ and $X^2$ join together to form a C4 to C62 cyclic or polycyclic ring structure;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a C1 to C40 hydrocarbyl, a functional group comprising elements from Group 13 to 17 of the periodic table of the elements, or independently, may join together to form a C4 to C62 cyclic or polycyclic ring structure, or a combination thereof; and Y is a divalent hydrocarbyl radical bridging the nitrogen atoms $N^1$ and $N^2$.

8. The process of claim 1, wherein the second metallocene catalyst precursor is selected from those having the following structure:

wherein M is a Group 4 metal;

each X is independently a halogen or C1 to C10 alkyl, or C6 to C10 aryl;

"A" is a methylene or ethylene, wherein the ethylene has two $R^1$ groups on each carbon, or "A" is a silane;

each $R^1$ is independently selected from hydrogens, C1 to C10 alkyls, and C6 to C10 aryls;

each of $R^2$ to $R^{13}$ is independently selected from hydrogens, C1 to C10 alkyls, C6 to C10 aryls, C7 to C24 alkylaryls, and C7 to C24 arylalkyls; and wherein $R^2$ and $R^3$ may form a C4 to C7 saturated or unsaturated ring.

9. The process of claim 1, wherein the second metallocene precursor is selected from those having the following structure:

wherein:

M is a Group 4 metal;

each X is independently a halogen or C1 to C10 alkyl, or C6 to C10 aryl;

"A" is a C1 to C6 alkylene, or "A" is a silane;

Q is a heteroatom or hydrocarbyl radical; wherein "n" is 1, 2 or 3;

each $R^1$ is independently selected from hydrogen, C1 to C10 alkyls, and C6 to C10 aryls;

each of $R^2$ to $R^5$ is independently selected from hydrogens, C1 to C10 alkyls, C6 to C10 aryls, C7 to C24 alkylaryls, and C7 to C24 arylalkyls; and wherein $R^6$ is selected from C1 to C10 alkyls, and C4 to C20 saturated or unsaturated rings.

10. The process of claim 1, wherein the polyethylene composition has a z-average molecular weight (Mz) of greater than 400,000 g/mole.

11. The process of claim 1, wherein the polyethylene composition has a molecular weight distribution (Mw/Mn) of greater than 5.

12. The process of claim 1, wherein the polyethylene composition has a branching index (g') of less than 0.9.

13. The process of claim 1, wherein the bVT-HDPE has a branching index (g') of less than 0.95.

14. The process of claim 1, wherein the polyethylene composition has a within a range from 1 to 4 branches per 1000 carbon atoms as measured by $C^{13}$ NMR.

15. A polyethylene composition comprising:

a polyethylene backbone, and one or more branched high density polyethylene combs pendant to the backbone, the combs having a number average molecular weight (Mn) of at least 5,000 g/mole, wherein the polyethylene backbone and branched high density polyethylene combs are formed by different catalysts; and wherein the polyethylene composition has a branching index (g') of less than 0.9 and has within a range from 1 to 4 branches per 1000 carbon atoms as measured by $C^{13}$ NMR.

16. The polyethylene composition of claim 15, having a bimodal molecular weight distribution.

17. The polyethylene composition of claim 15, having a number average molecular weight (Mn) within a range from 30,000 g/mole to 100,000 g/mole.

18. The polyethylene composition of claim 15, having a z-average molecular weight (Mz) of greater than 400,000 g/mole.

19. The polyethylene composition of claim 15, having a molecular weight distribution (Mw/Mn) greater than 5.

20. The polyethylene composition of claim 15, having within a range from 1 to 3 branches per 1000 carbon atoms as measured by $C^{13}$ NMR.

21. The polyethylene composition of claim 15, having a density of greater than 0.935 g/cm³.

22. The polyethylene composition of claim 15, having a peak melting point temperature ($T_{m2}$) within a range from 125° C. to 140° C.

23. The polyethylene composition of claim 15, having a heat of melting ($\Delta H_m$) within a range from 180 J/g to 245 J/g.

24. A modifier for a polyolefin comprising within a range from 0.05 wt % to 10 wt % of the polyethylene composition of claim 15.

25. A process for making a polyethylene composition comprising:
    contacting, at a temperature of at least 100° C., ethylene with a first salan catalyst precursor and an activator to form branched vinyl/vinylidene-terminated high density polyethylene ("bVT-HDPE") having a number average molecular weight (Mn) of at least 5,000 g/mole;
    contacting, at a temperature of at least 100° C., the bVT-HDPE with ethylene and a second metallocene catalyst precursor and an activator to form a comb-block HDPE; and
isolating a polyethylene composition comprising:
    a polyethylene backbone, and one or more branched high density polyethylene combs pendant to the backbone, the combs having a number average molecular weight (Mn) of at least 5,000 g/mole, wherein the polyethylene backbone and branched high density polyethylene combs are formed by different catalysts; and
    wherein the polyethylene composition has a branching index (g') of less than 0.9 and has within a range from 1 to 4 branches per 1000 carbon atoms as measured by $C^{13}$ NMR.

26. The process of claim 25, having a bimodal molecular weight distribution.

27. The process of claim 25, having a number average molecular weight (Mn) within a range from 30,000 g/mole to 100,000 g/mole.

28. The process of claim 25, having a z-average molecular weight (Mz) of greater than 400,000 g/mole.

29. The process of claim 25, having a molecular weight distribution (Mw/Mn) greater than 5.

30. The process of claim of claim 25, having within a range from 1 to 3 branches per 1000 carbon atoms as measured by $C^{13}$ NMR.

31. The process of claim 25, having a density of greater than 0.935 g/cm$^3$.

32. The process of claim 25, having a peak melting point temperature ($T_{m2}$) within a range from 125° C. to 140° C.

33. The process of claim 25, having a heat of melting ($\Delta H_m$) within a range from 180 J/g to 245 J/g.

* * * * *